(12) United States Patent
Rodriguez

(10) Patent No.: US 12,103,641 B2
(45) Date of Patent: Oct. 1, 2024

(54) BICYCLE BELT OR CHAIN TENSIONER AND INTERNALLY GEARED HUB CONVERSION KIT

(71) Applicant: Perrin Stacy Rodriguez, Cypress, TX (US)

(72) Inventor: Perrin Stacy Rodriguez, Cypress, TX (US)

( * ) Notice: Subject to any disclaimer, the term of this patent is extended or adjusted under 35 U.S.C. 154(b) by 399 days.

(21) Appl. No.: 17/439,005

(22) PCT Filed: Feb. 4, 2021

(86) PCT No.: PCT/US2021/016509
§ 371 (c)(1),
(2) Date: Sep. 14, 2021

(87) PCT Pub. No.: WO2021/158721
PCT Pub. Date: Aug. 12, 2021

(65) Prior Publication Data
US 2022/0144381 A1 May 12, 2022

Related U.S. Application Data

(60) Provisional application No. 62/971,543, filed on Feb. 7, 2020.

(51) Int. Cl.
*B62M 9/16* (2006.01)
*B62K 19/30* (2006.01)
(Continued)

(52) U.S. Cl.
CPC .............. *B62M 9/16* (2013.01); *B62K 19/30* (2013.01); *B62M 9/06* (2013.01); *B62M 11/04* (2013.01)

(58) Field of Classification Search
CPC .......... B62M 9/06; B62M 9/04; B62M 11/04; B62M 9/10; B62M 9/12; B62M 11/00; F16H 11/18
(Continued)

(56) References Cited

U.S. PATENT DOCUMENTS 4,023,424 A * 5/1977 Ryan ...................... B62M 9/125
280/238
4,099,737 A 7/1978 Waugh
(Continued)

FOREIGN PATENT DOCUMENTS

DE 202015001386 U1 4/2015
EP 0513394 A1 * 11/1992
(Continued)

OTHER PUBLICATIONS

International Search Report and written opinion issued on May 25, 2021 on the related International Application of No. PCT/US2021/016509 filed internationally on Feb. 4, 2021.

*Primary Examiner* — Henry Y Liu
(74) *Attorney, Agent, or Firm* — Mardson Q McQuay

(57) ABSTRACT

Bicycle belt or chain drive tensioning systems and IGH-thru-axle conversion systems are described that includes first and second anti-rotation keys, a bushing, and first and second fasteners configured to center the IGH laterally within first and second dropouts of the bicycle. The belt or chain tensioning device includes a mounting clamp, a swing arm assembly with a stepped pivot shaft, a swing arm, a first pulley rotatably supported by the pivoted shaft, and a second pulley rotatably attached to the swing arm, the first pulley and the swing arm rotating about a longitudinal axis of the stepped pivot shaft. Methods for assembly and operation of such systems are also disclosed.

20 Claims, 13 Drawing Sheets

(51) Int. Cl.
  *B62M 9/06* (2006.01)
  *B62M 11/04* (2006.01)
(58) Field of Classification Search
  USPC ................................ 474/112, 110, 134, 135
  See application file for complete search history.

(56) References Cited

U.S. PATENT DOCUMENTS

| | | | |
|---|---|---|---|
| 4,637,808 A | 1/1987 | Nakamura | |
| 5,054,801 A * | 10/1991 | Maguire | B62M 9/16 474/56 |
| 5,221,236 A | 6/1993 | Raymer et al. | |
| 7,824,285 B2 * | 11/2010 | Tan | B62M 9/127 474/82 |
| 7,905,805 B2 * | 3/2011 | Hara | B62M 9/16 474/81 |
| 7,946,659 B2 | 5/2011 | Gratz | |
| 7,955,205 B2 * | 6/2011 | Urabe | B62M 9/16 474/80 |
| 8,136,827 B2 | 3/2012 | Lumpkin | |
| 8,505,947 B2 * | 8/2013 | Burdick | B62M 9/04 301/110.5 |
| 9,290,235 B2 * | 3/2016 | Yamaguchi | B62M 9/124 |
| 2005/0285461 A1 * | 12/2005 | Kitamura | H02K 1/145 310/67 R |
| 2008/0284127 A1 * | 11/2008 | Watarai | B62K 25/02 280/279 |
| 2009/0088284 A1 * | 4/2009 | Patterson | B62J 13/04 475/213 |
| 2009/0243255 A1 * | 10/2009 | Ashman | B62K 25/02 280/288 |
| 2010/0113200 A1 * | 5/2010 | Yamamoto | B62M 9/16 474/133 |
| 2010/0295265 A1 * | 11/2010 | Burdick | B62M 9/04 280/288.4 |
| 2012/0088618 A1 * | 4/2012 | Scolari | B62M 9/04 474/135 |
| 2012/0322594 A1 | 12/2012 | Kitamura et al. | |
| 2014/0018199 A1 * | 1/2014 | Shahana | B62M 9/126 474/82 |
| 2014/0235383 A1 | 8/2014 | Wesling | |
| 2014/0357437 A1 * | 12/2014 | Hara | B62M 9/16 474/113 |
| 2018/0229793 A1 * | 8/2018 | Cody | B62J 13/00 |
| 2018/0362108 A1 * | 12/2018 | Yamazaki | B62J 6/12 |
| 2020/0062344 A1 * | 2/2020 | Liao | B62M 9/1242 |
| 2020/0346710 A1 | 11/2020 | Komatsu et al. | |

FOREIGN PATENT DOCUMENTS

| | | | | |
|---|---|---|---|---|
| EP | 1486407 A2 * | 12/2004 | | B62J 13/00 |
| EP | 2628681 A1 * | 8/2013 | | B64F 5/0045 |
| WO | 1981000546 A1 | 3/1981 | | |

* cited by examiner

BICYCLE BELT OR CHAIN TENSIONER AND INTERNALLY GEARED HUB CONVERSION KIT

CROSS REFERENCE TO RELATED APPLICATIONS

This application claims priority to U.S. Patent Application of Ser. No. 62/971,543, filed on Feb. 7, 2020, entitled "BICYCLE BELT DRIVE AUTOMATIC BELT TENSIONING SYSTEM AND IGH-THRU AXLE CONVERSION SYSTEM," the contents of which are herein incorporated by reference in their entirety.

BACKGROUND

Technical Field

Embodiments of the subject matter disclosed herein relate generally to apparatuses, methods and systems and, more particularly, to devices, processes, mechanisms and techniques related to bicycles internally geared hub conversion systems and belt or chain tensioning devices.

Description of Related Art

The global bicycle market in 2017 was estimated at more than 140 million bicycles sold around the world, including a wide range of bicycles used for leisure, transportation to and from the workplace, professional riding, and competition. The improvement in bicycle design has progressed to the point that worldwide manufacturers now offer units that are purpose-built for commuter, road, and hardtail mountain bikes with sophisticated and expensive systems. Example of such systems include front and rear suspensions, disk brakes, variable-speed capability using either a derailleur or an Internally Geared Hub (also known as a hub gear, an internal-gear hub, an internally geared hub, or just a gear hub, hereinafter referred to as an IGH) to allow a user to shift gears as needed as well as a belt-driven system instead of the old chain-and-sprocket technology to power the bicycles with work input from a pedaling rider.

The advancements in these technologies are such that users will spend significant amounts of funds to benefit from these improvements. Consider, for example, the benefits and advantages of a bike equipped with a belt-driven IGH system compared to a bicycle powered by a chain-driven derailleur, including, but not being limited to, increased longevity, low maintenance, significant noise reduction, and minimum to no periodic lubrication requirements. Unfortunately, despite the high cost to purchase such purpose-built bikes, there is no commercial, off-the-shelf, turnkey solution to adapt a belt- or chain-driven IGH that can be purchased on the open market from an Original Equipment Manufacturer (OEM), or any other source for the purposes of this disclosure, onto a typical bicycle, for example, a full-suspension mountain bike originally equipped with a multi-gear derailleur.

There are several reasons for the above-noted challenges, including: (1) there is a shortage of OEM IGH systems that are thru-axle compatible and will fit newer bikes with a thru-axle system of a given rear spacing. And when such systems can be purchased, they are very expensive compared to the cost of a high-end bicycle (e.g., a mountain bike); (2) chain stay length changes relative to the rear suspension travel on typical full-suspension mountain bikes; (3) the requirement for a tensioning system to maintain tension on the slack side of the belt as well as the required use of a snubber to keep the belt properly set in the pulleys in dynamic applications, such as a full-suspension mountain bike; and (4) the belt is usually a one-piece design and the rear triangle of the bike needs to somehow accommodate a way to come apart to install the belt.

However, despite the above-summarized technological advances in bicycle design to date no devices, processes, and/or methods exist that will allow a user to install an OEM IGH system (driven by either a chain or a belt) with a novel tensioning device on an existing bicycle for any given rear-axle configuration, including a thru-axle system, at a reasonable cost to the user compared to the price paid for the entire bike being modified. The novel embodiments of the tensioning systems disclosed herein are capable of automatically maintaining adequate tension on a belt or chain while serving as a snubber to keep the belt in contact with the rear cog to prevent ratcheting/slippage. Due to their modularity, the devices, systems, processes and/or methods disclosed herein can be installed and adapted onto essentially any brand or type of bicycle by use of an OEM specific axle conversion solution and a hanger adapter that will allow the user to adjust the belt or chain preload, have integrated coarse and fine alignment capabilities, and enjoy the benefits of an open swing arm design. As it will be further explained herein, the disclosed systems offer end consumers a lower cost option and opportunity to enjoy the benefits of a chain- or belt-driven IGH without having to purchase a purpose-built bike as the disclosed systems can be adapted individually or together to most existing bicycles.

SUMMARY

One or more of the above-summarized needs or others known in the art are addressed by apparatuses, methods, and processes to apply tension to the belt or chain of a bicycle and/or a conversion kit to replace a chain-driven derailleur of a conventional bicycle with a chain- or belt-driven IGH. As disclosed herein, such apparatuses include a kit for converting a bicycle from a derailleur-sprocket drive system to an Internally Geared Hub (or an IGH) drive system, that includes a first anti-rotation key to be disposed over a first end portion of the axle of the IGH so as to prevent the axle from rotating; a bushing fitting over the first end portion of the axle having a slanted chamfer on a first end portion thereof to engage with a corresponding chamfer on the first dropout of the bicycle, and a flat end portion opposite to the first end portion of the bushing; a first fastener to secure the first end portion of the axle to the bicycle, the first fastener having a flange to engage with the flat end portion of the bushing; and a second fastener to secure the second end portion of the axle to the bicycle, wherein the first and second fasteners are configured to center the IGH laterally within the first and second dropouts when both fasteners are tightened.

Such apparatuses further include a belt or chain tensioning device for a bicycle that includes a mounting clamp; a swing arm assembly supported by the mounting clamp, the swing arm assembly including a cylindrical body; a stepped pivot shaft, and a torsion spring having a first end thereof secured to the cylindrical body, wherein the stepped pivot shaft is attached to the spring housing by a screw; a swing arm having a plurality of blind holes to receive a second end of the torsion spring; a first pulley rotatably supported by the pivoted shaft, wherein the first pulley and the swing arm rotate about a longitudinal axis of the stepped pivot shaft; and a second pulley rotatably attached to the swing arm at a second end portion thereof.

Methods for converting the drive system of a bicycle from a thru-axle-derailleur-sprocket drive system to an Internally Geared Hub (or an IGH) drive system are also with the scope of the subject matter disclosed herein. Such methods include the steps of inserting a first anti-rotation key on a first end portion of an axle of the IGH, so as to prevent the IGH axle from rotating when the IGH is secured to the bicycle; inserting the first end portion of the axle with the first anti-rotation key through a first dropout; inserting a bushing having a thru hole that fits over the first end portion of the axle, the busing comprising a slanted chamfer on a first end portion thereof to engage with a corresponding chamfer on the first dropout, and a flat end portion opposite to the first end portion of the bushing; inserting a second end portion of the axle through a second dropout in the frame of the bicycle; fastening a first fastener to the first end portion of the axle, the first fastener having a smooth shank with an outer diameter so as to fit thru a hole in the first dropout, and a flange to engage with the flat end portion of the bushing; and fastening a second fastener to the second end portion of the axle to secure the second end portion of the axle to the bicycle, wherein the first and second fasteners are configured to center the IGH laterally within the first and second dropouts when both fasteners are fastened.

Methods for applying tension to the belt or chain of a bicycle are also within the scope of the subject matter claimed herein. Such methods including the steps of placing the chain or belt over a driving cog of the bicycle; retracting a swing arm of a tensioner attached to the bicycle; feeding the chain or belt over first and second pulleys on the swing arm of the tensioner; and releasing the swing arm against the belt or chain, wherein the first pulley and the swing arm rotate about the same axis of rotation.

BRIEF DESCRIPTION OF THE DRAWINGS

The accompanying drawings (not drawn to scale), which are incorporated in and constitute a part of the specification, illustrate one or more embodiments and, together with the description, explain these embodiments. In the drawings.

DETAILED DESCRIPTION

Figure 1:
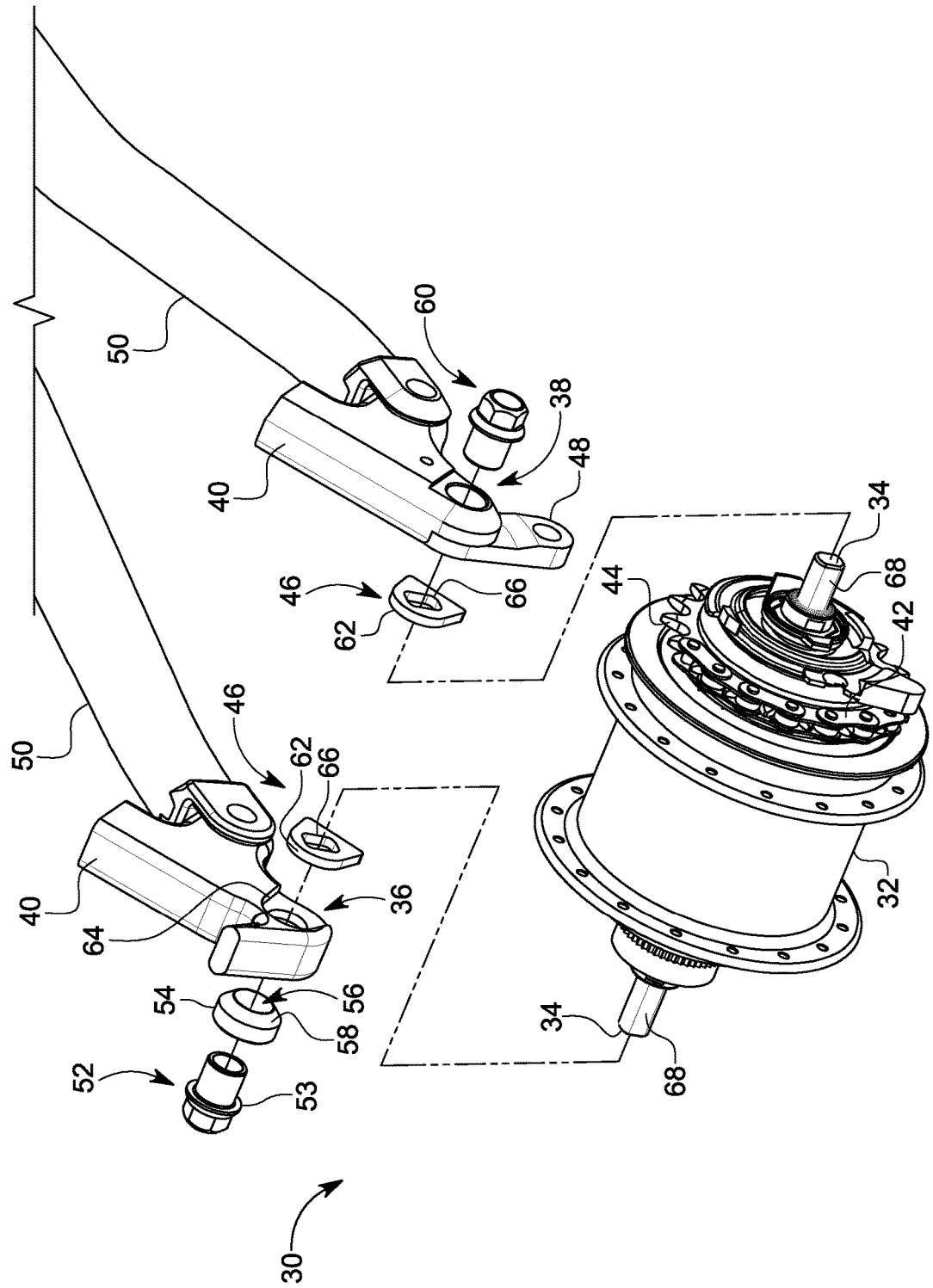
FIG. 1 illustrates an exploded isometric view of an exemplary embodiment of a chain-driven, solid-axle IGH according to one aspect of the subject matter disclosed.

The following description of the exemplary embodiments refers to the accompanying drawings. The same reference numbers in different drawings identify the same or equivalent elements. The following detailed description does not limit the invention. Instead, the scope of the invention is defined by the appended claims. The following embodiments are discussed, for simplicity, with regard to the terminology and structure of apparatuses, systems, or methods for installing a solid-axle IGH device driven by a chain or belt in a conventional bicycle with or without a novel and advantageous tensioning device. The example techniques and embodiments described herein may be adapted to various types of systems and devices, for example but without limitation, various types of bicycles, including mountain bikes.

While the embodiments herein may be described with respect to various systems and implementations as conceptual and/or illustrative examples for descriptive consistency, other types of bicycles and system equivalents are also contemplated for implementing the disclosed devices and techniques. It is contemplated herein that, in various embodiments and with respect to the illustrated figures of this disclosure, one or more components described and/or shown may not be included and that additional components may be included. Furthermore, it is contemplated that the disclosed embodiments may be combined with each other in any manner. That is, the embodiments described herein are not mutually exclusive of each other and may be practiced and/or implemented alone, or in any combination.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, the particular features, structures, or characteristics may be combined in any suitable manner in one or more embodiments. The present specification discloses numerous example embodiments. The scope of the present patent application is not limited to the disclosed embodiments, but also encompasses combinations of the disclosed embodiments, as well as modifications to the disclosed embodiments.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Moreover, it should be noted that the drawings/figures are not drawn to scale.

Figure 2:
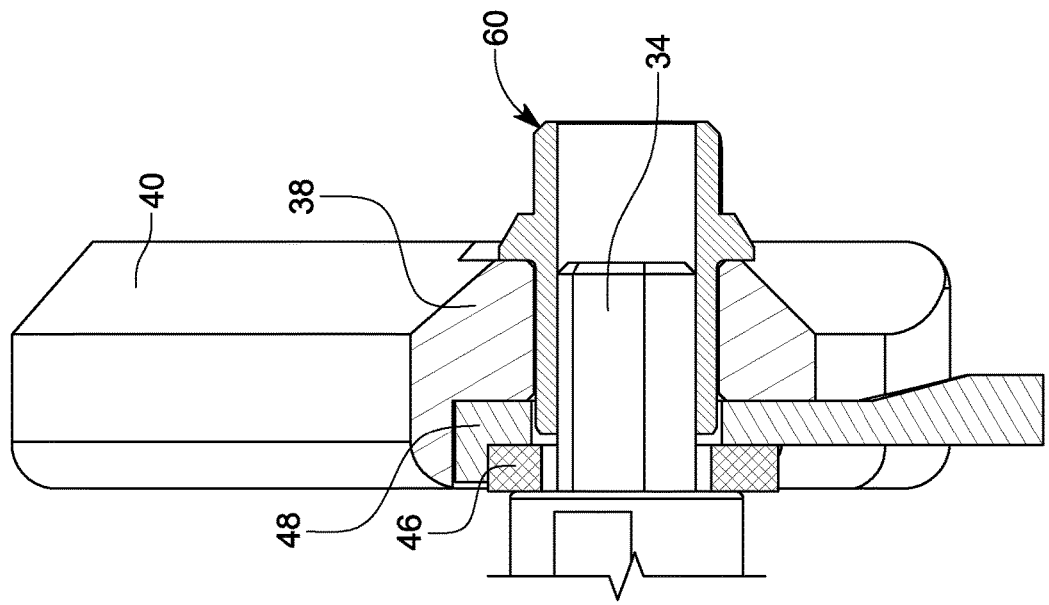
FIG. 2 illustrates sectional views of the left- and right-hand dropout portions of FIG. 1.
Figure 2:
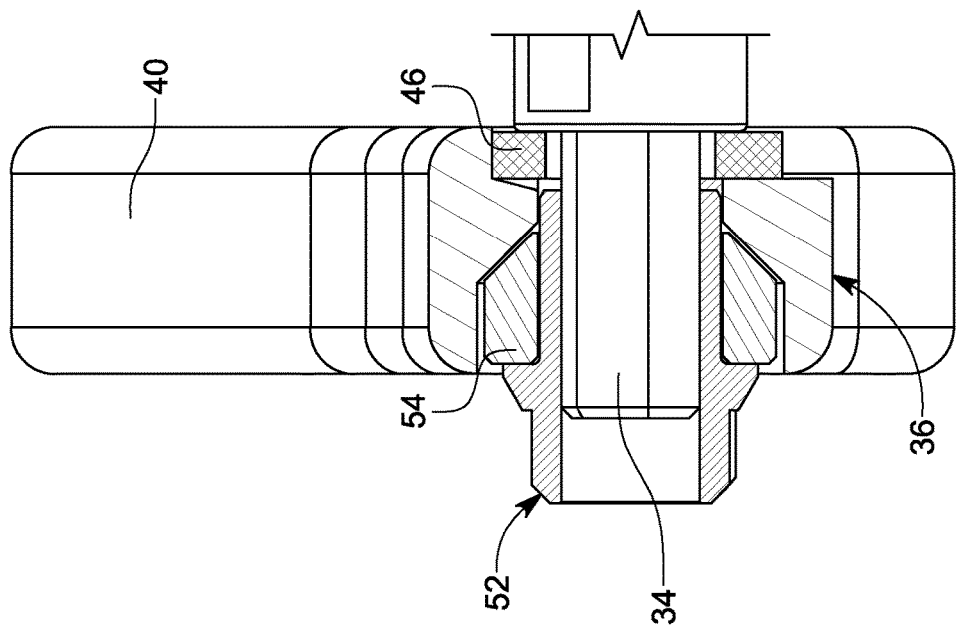

FIGS. 1 and 2 illustrate a first embodiment of a chain-driven, solid-axle IGH conversion system 30 according to the subject matter disclosed herein. FIG. 1 is an exploded view of the various components and FIG. 2 shows sectional views of the left-hand and right-hand-side dropouts of FIG. 1 substantially along a plane defined by the dashed lines shown in FIG. 1. Both figures will be used to explain the IGH conversion system 30 illustrated therein. As shown, the IGH conversion system 30 includes a solid-axle IGH 32 having the end portions of its axle 34 attached to left-hand- (36) (for an observer viewing the back from the back facing forward) and right-hand-side (38) dropouts of a bicycle frame rear triangle formed by seat (40) and chain (50) stays. A thru-axle system precisely locates the wheels and does not allow for any adjustment of the wheel position relative to the center of the bottom bracket. The thru-axle system utilizes a removable axle shaft (with a male thread on one end) that is restrained by thru holes (instead of slots on each dropout) and secured by a female thread which may be incorporated into one of the thru holes or by other means. Those of ordinary skill in the art will appreciate that the novel and advantageous features of the subject matter disclosed herein apply equally well to older frames and low-end bicycles that use conventual dropouts which possess slots that are typically one of three configurations: vertical, horizontal, or track.

In the illustration shown in FIGS. 1 and 2, the IGH 32 is driven by a chain 42 connected to a sprocket 44 attached to the IGH 32. Power is transmitted to the chain 42 which is coupled to the bicycle's front sprocket/crankset/pedals (not shown, but understood). Anti-rotation keys 46 are used to prevent the axle 34 from rotating when input torque is applied to the sprocket 44. In some embodiments, the anti-rotation keys 46 also function as a spacer so as to position the IGH 32 axially between the dropouts 36 and 38. This spacer functionality is desired in embodiments in which the longitudinal dimension of the IGH 32 is smaller than the frame spacing of the dropouts 36 and 38. The bicycle embodiment shown in FIGS. 1 and 2 may also comprise a derailleur hanger 48 and the chain stay 50.

On the left-hand-side dropout 36, a fastener 52 threaded to the shaft 34 is configured to center the IGH 32 laterally within the thru hole in that dropout and to secure the system by applying a clamping force. The fastener 52 has a female thread on the inside to thread to corresponding male threads on the shaft 34 but a smooth shank with an outer diameter slightly smaller than the ID of the thru hole in the dropout. As illustrated, the fastener 52 engages with a cone bushing 54 by a flange 53 forcing the bicycle frame against the anti-rotation key 46, preventing the axle 34 from rotating when input torque is applied to the rear sprocket 44 while positioning the IGH 32 axially between the dropouts 36 and 38. On the embodiment illustrated in FIGS. 1 and 2, the cone bushing 54 comprises a short cylinder having a thru hole 56 and a slanted chamfer 58 on the end pushing against the bicycle frame, the angle of chamfer being selected to match a corresponding slanted surface of the bicycle dropout. On the right-hand-side dropout 38, another fastener 60 is threaded to the other side of the shaft 34 of the IGH 32 centering that shaft and clamping the derailleur hanger 48 (for embodiments using a derailleur) and another anti-rotation key 46 to complete the installation of the IGH conversion system 30 to the frame of the bicycle. Those of ordinary skill in the applicable arts, after considering the subject matter disclosed in FIGS. 1 and 2, will understand that, depending on the characteristics of the OEM IGH device being adapted to the frame of another conventional bicycle, the design of the fasteners 52 and 60, the cone bushing 54, and the derailleur hanger 48 may be modified as needed. For example, a second cone bushing could be used in a bicycle having a different dropout or IGH shaft attachment design, and yet, in other embodiments, a cone bushing may not be needed.

The thickness of the anti-rotation keys 46 and their outer profile may be varied according to the specific IGH and bicycle to be adapted with the IGH conversion system 30. In the embodiment illustrated in FIGS. 1 and 2, the anti-rotation keys 46 are approximately 2.5 mm thick and have an outer profile 62 (on the right) that mates with alignment guides 64 on the rear dropouts 36 and 38 and the derailleur hanger 48 so as to prevent the spacer from rotating. The rectangular thru slots 66 of the anti-rotation keys 46 mate with flat surfaces 68 of the IGH axle 34 and thus restrain the axle 34 rotationally.

Those of ordinary skill in the applicable arts will appreciate that the embodiment illustrated in FIGS. 1 and 2 is for an IGH conversion system 30 for an IGH that utilizes a solid-axle design having a given spacing so as to allow the mounting of the conversion system to the rear triangle of a typical mountain bicycle frame that utilizes a thru-axle system, while maintaining the structural integrity of the system when the IGH system is installed, as it will be further explained below. Those of ordinary skill will also appreciate that, in some embodiments, a solid-axle IGH is to be installed on a bicycle frame with dropouts that possess slots with open ends that allow the IGH to be slid into place from the bottom or rear side of the dropout. In such cases, in order to facilitate the installation of the IGH onto the frame, modification to the axle may be desirable. In other embodiments, an installation method (to be described later in the document) was devised to install the IGH that includes temporarily increasing the spacing of the rear dropouts of the rear triangle of the frame by a prescribed amount sufficient to insert the IGH system 30 without resulting in permanent damage to the bicycle frame. In such cases, in order to prevent plastic deformation of the bicycle frame, the overall length of the IGH axle 34 may be shortened by removing a portion thereof from each end, in-situ.

Figure 3:
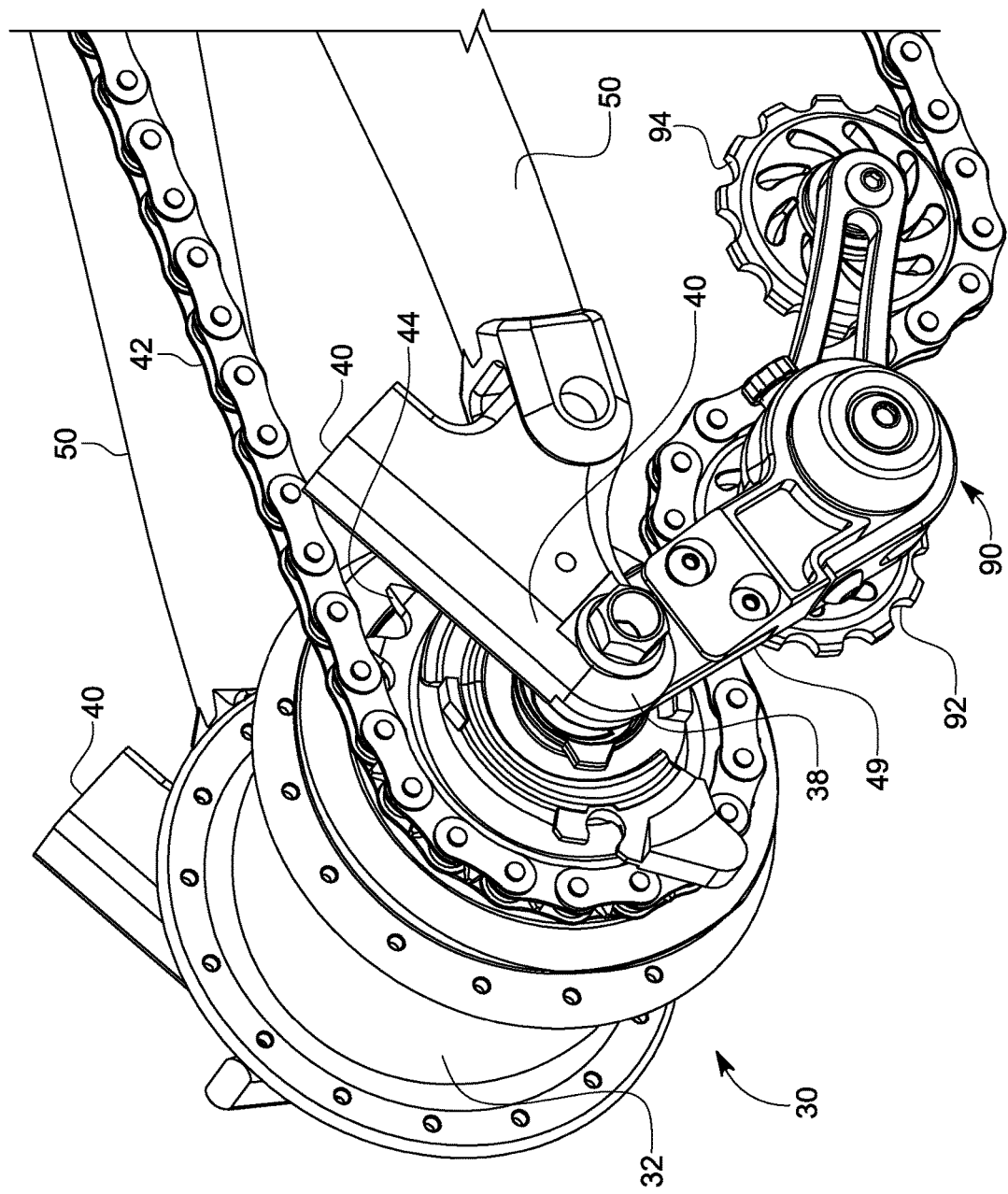
FIG. 3 illustrates an isometric view of the chain-driven, solid-axle IGH of FIG. 1 with a tensioner device according to another aspect of the subject matter disclosed.

FIG. 3 illustrates a novel and advantageous tensioner 90 attached to the IGH system 30 of FIGS. 1 and 2. As shown, this modular tensioner 90 is mounted to a hanger adapter 49 so as to apply tension to the chain 42 of the IGH system 30. In some embodiments the hanger adapter 49 is designed taking into consideration the particular installation needs and installed in the general location of a conventional derailleur hanger. The tensioner 90 shown in FIG. 3 is for a chain-driven IGH system 30, said tensioner comprising first and upper sprocket 92 and second or lower sprocket 94 to engage and apply tension to the chain 42. Further details of the tensioner 90 will be explained further below in the context of a belt-driven system, but those of ordinary skill in the art will appreciate that many, if not all, of the advantageous features of a belt-driven tensioner will apply equivalently to the chain-driven system illustrated in FIG. 3.

Figure 4:
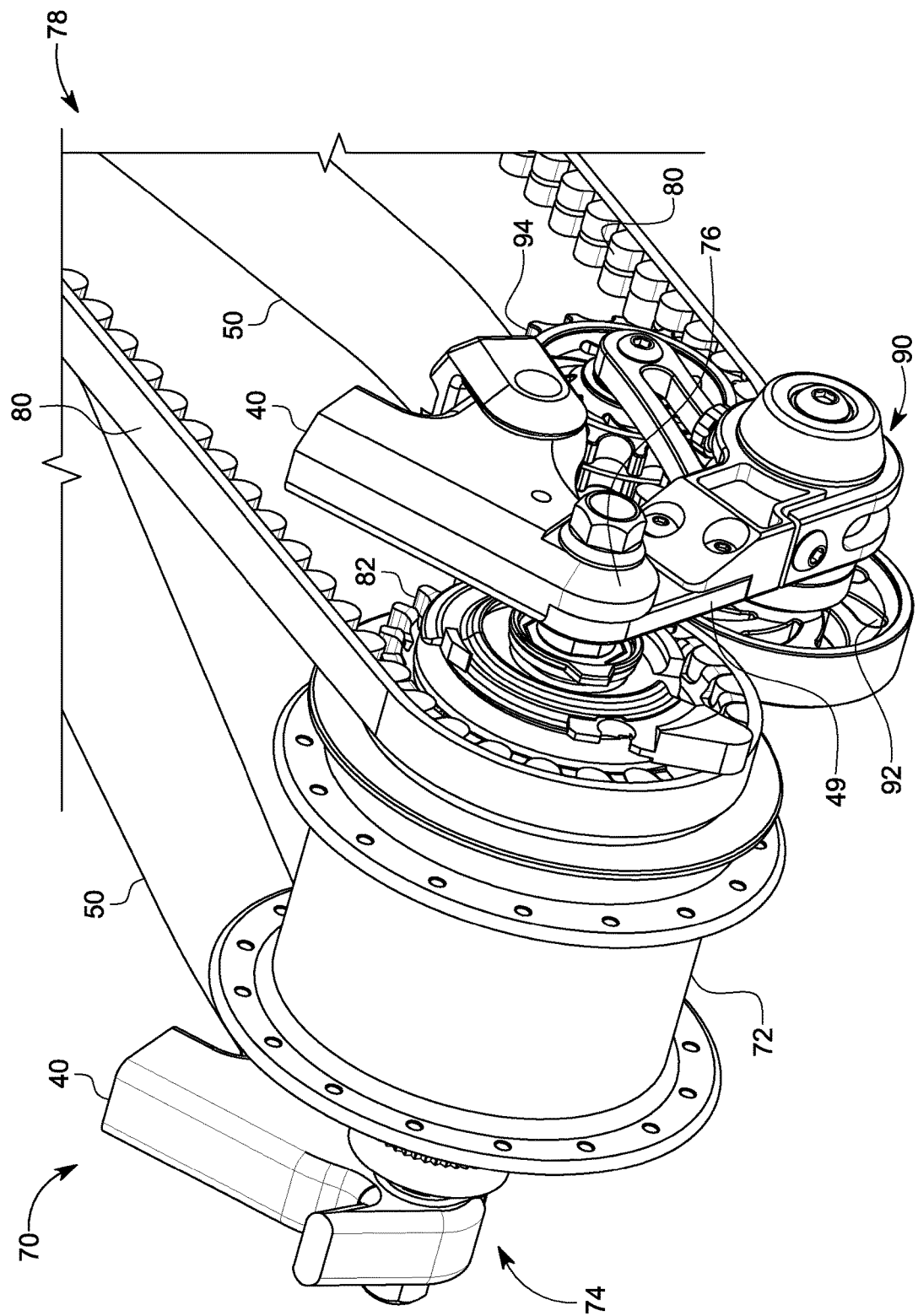
FIG. 4 illustrates an isometric view of another exemplary embodiment of a belt-driven IGH according to another aspect of the subject matter disclosed.
Figure 5:
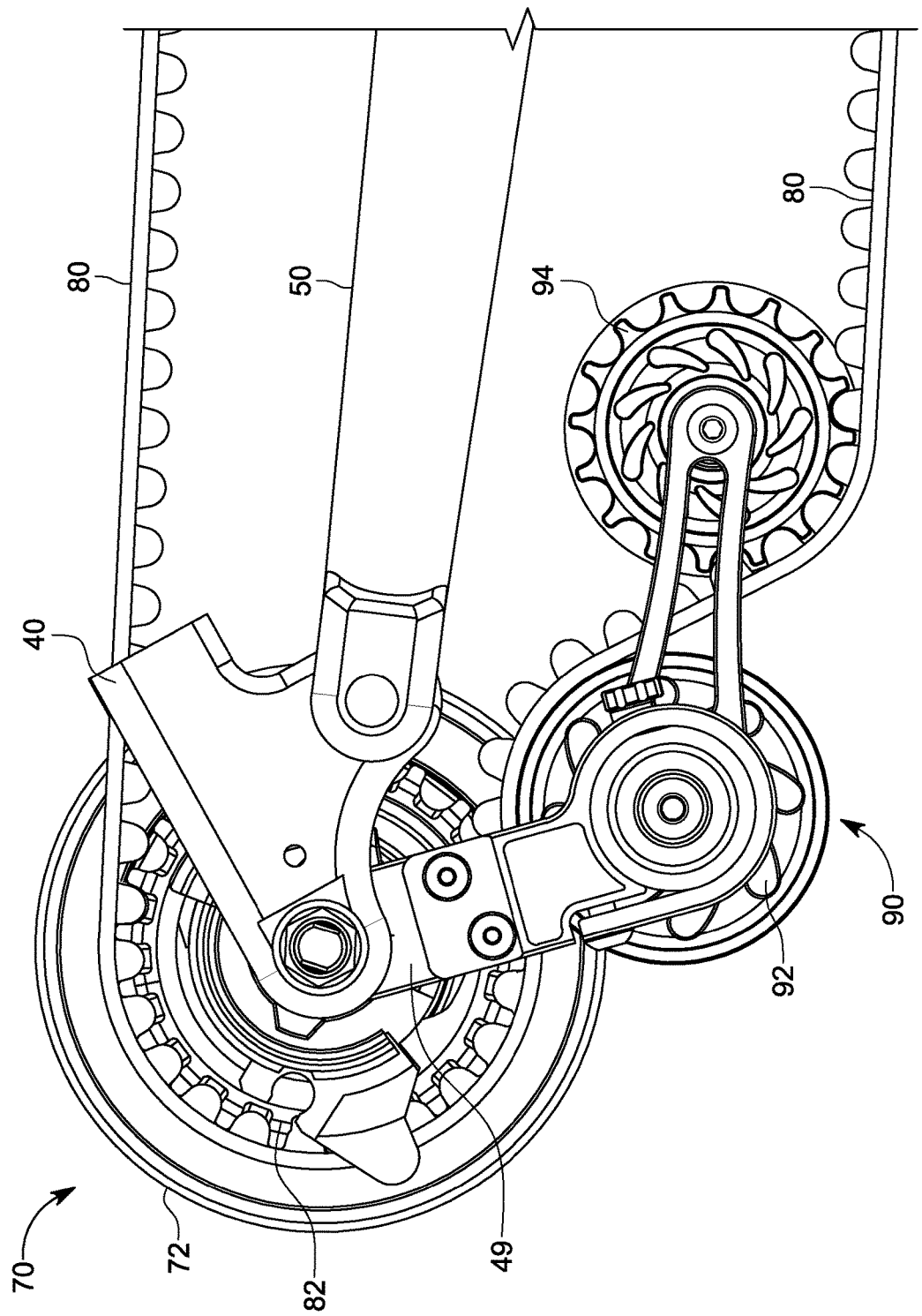
FIG. 5 illustrates an orthogonal view of the exemplary embodiment of FIG. 4.

FIGS. 4 and 5 illustrate a belt-driven IGH conversion system 70. FIG. 4 shows an isometric view of the IGH conversion system 70 and FIG. 5 illustrates an orthogonal view of the embodiment shown in FIG. 4. As shown, an IGH 72 is installed into right-hand (76) and left-hand-side (74) dropouts of a rear triangle of a frame (formed at least in part by seat (40) and chain (50) stays) of a conventional bicycle driven by a belt 80 connected to a belt-driven pulley, sprocket, or cog 82 installed onto the IGH 72. The embodiment shown in FIGS. 4 and 5 also includes the tensioner system 90 that includes the upper or first (92) and the lower or second (94) pulleys configured to maintain tension on the slack side of the belt 80. In the embodiment illustrated in FIGS. 4 and 5, the tensioner 90 is attached to the hanger adapter 49, as shown. The disposition of the tensioner 90 with respect to the IGH 72 is further illustrated in FIG. 5. The attachment of the IGH conversion system 70 to the right and left dropouts 76 and 74 are substantially similar to the one illustrated in FIG. 1 and will not be repeated here. One advantageous feature of the tensioner 90 is the fact that the first pulley 92 is disposed in such a way with respect to the sprocket 82 that it acts as a snubber, in dynamic applications such as a mountain bicycle having a full suspension, thus eliminating the need for such a device in the IGH conversion system 70. (The snubber functionality can be seen in both FIGS. 4 and 5.) Those of ordinary skill in the art will appreciate that by proper adjustment of the position of the first or upper pulley with respect to the rear belt cog will effectively allow the first pulley to act as an integrated snubber thus preventing the belt from slipping or ratcheting during hard pedaling. Such advantageous feature of an integrated snubber will require less tension to be applied to the slack side of the belt thereby extending the life of the belt, and all related components in the system.

The embodiments shown in FIGS. 1-5 allow the bicycle wheel with an IGH to be installed onto the rear triangle of a conventional bicycle by the following process. First, one anti-rotation key 46 is installed on each side of the axle 34 for the IGH 32 driven by a chain. If the IGH 72 is belt-driven, one should install one anti-rotation key 46 on the left-hand side and the derailleur hanger 48 (FIGS. 1 and 2) or the hanger adapter 49 (FIGS. 3-5) on the right-hand side of the axle. The rear wheel should then be tilted sufficiently so that the non-driven side portion of the axle/hub can be inserted into the thru hole of the left-hand dropout. While aligning the anti-rotation key, the installer should then spread the rear triangle of the frame further apart so as to allow greater spacing between the dropouts, and thus insertion of the driven side of the hub/axle into the rear triangle by applying force with one hand and holding the wheel with the other until the spacing between the dropouts is wide enough to tilt the wheel into place so that the axle portion on the drive side of the hub aligns with the right-side dropout thru hole. While maintaining axle alignment with the right-hand (drive side) dropout thru hole, one should remove the spreading force from the rear triangle and install both fasteners 52 and 60 and torque them to the OEM specifications.

Those of ordinary skill in the applicable arts will appreciate that the embodiments illustrated in FIGS. 1-5 provide a means and method to mount an IGH and wheel assembly onto bicycle frames with a thru-axle system, without affecting the functionality and structural integrity of the system. As already explained, the conversion system disclosed herein can be used independently of other systems (e.g., the novel and advantageous tensioner system 90) with a standard chain if desired since there are multiple off-the-shelf chain tensioners available that will accommodate a chain-driven setup.

Figure 6:
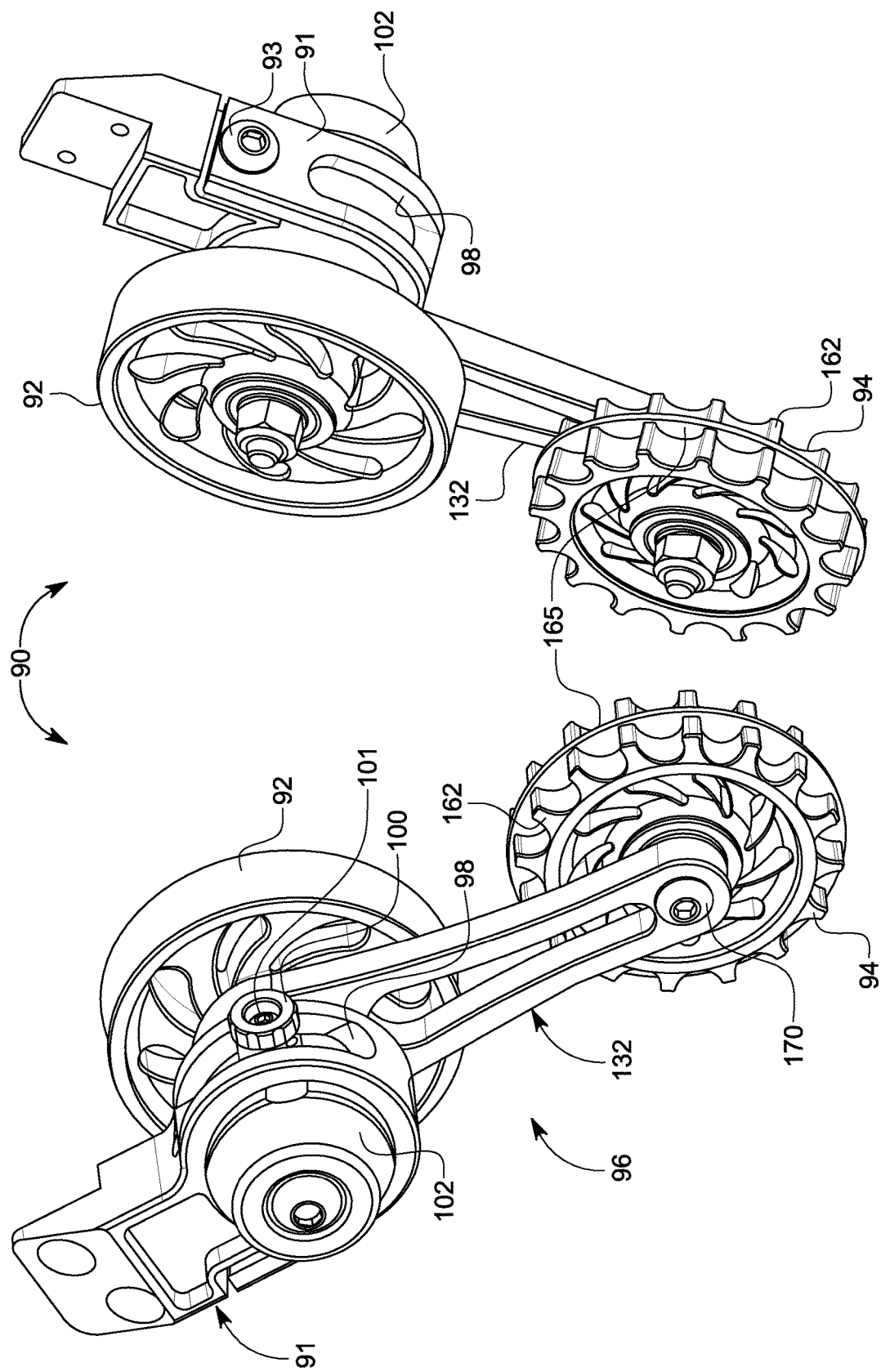
FIG. 6 illustrates isometric views from two different perspectives of a tensioner device according to another aspect of the subject matter disclosed.
Figure 7:
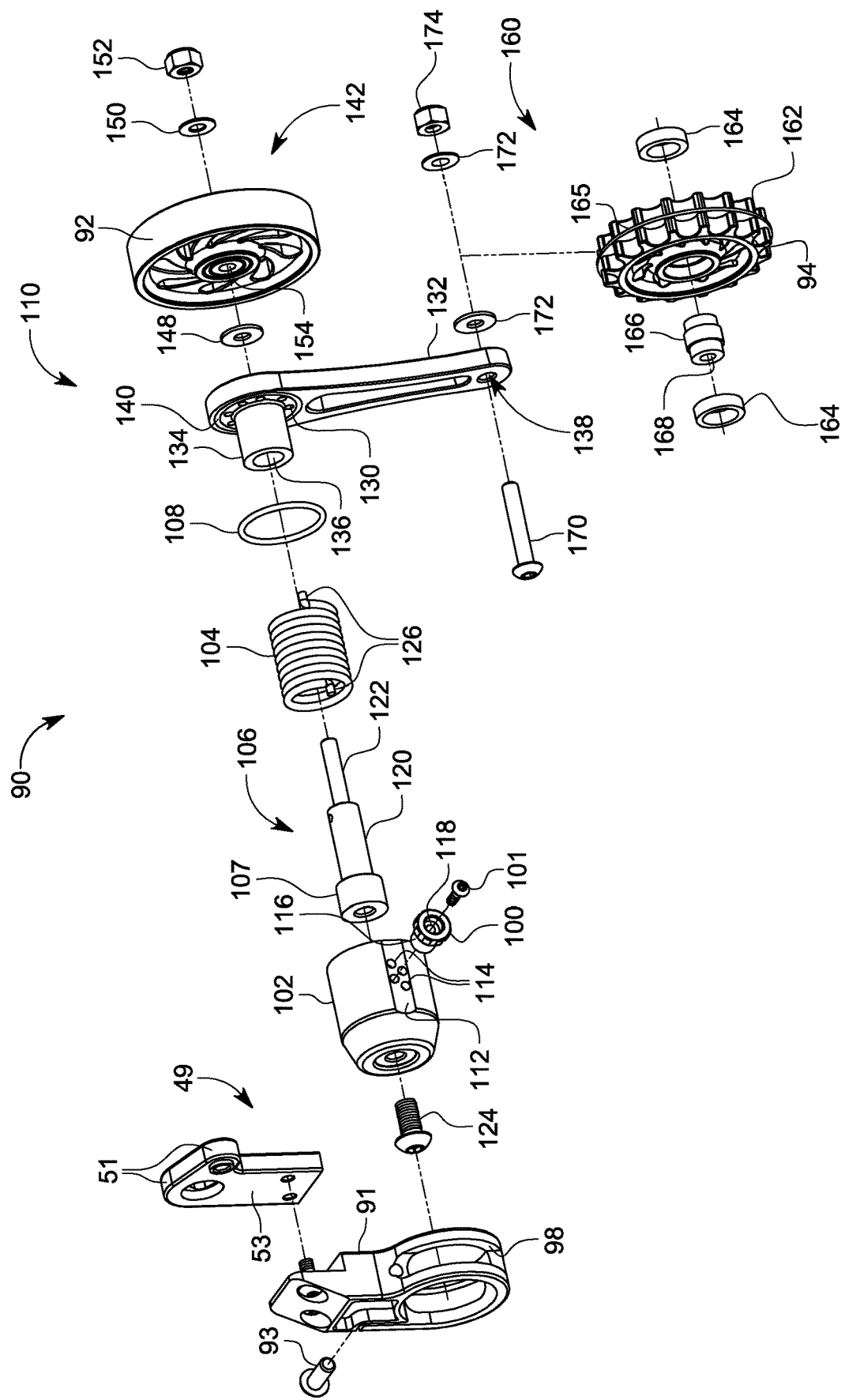
FIG. 7 illustrates an exploded isometric view of the tensioner device shown in FIG. 6.
Figure 8:
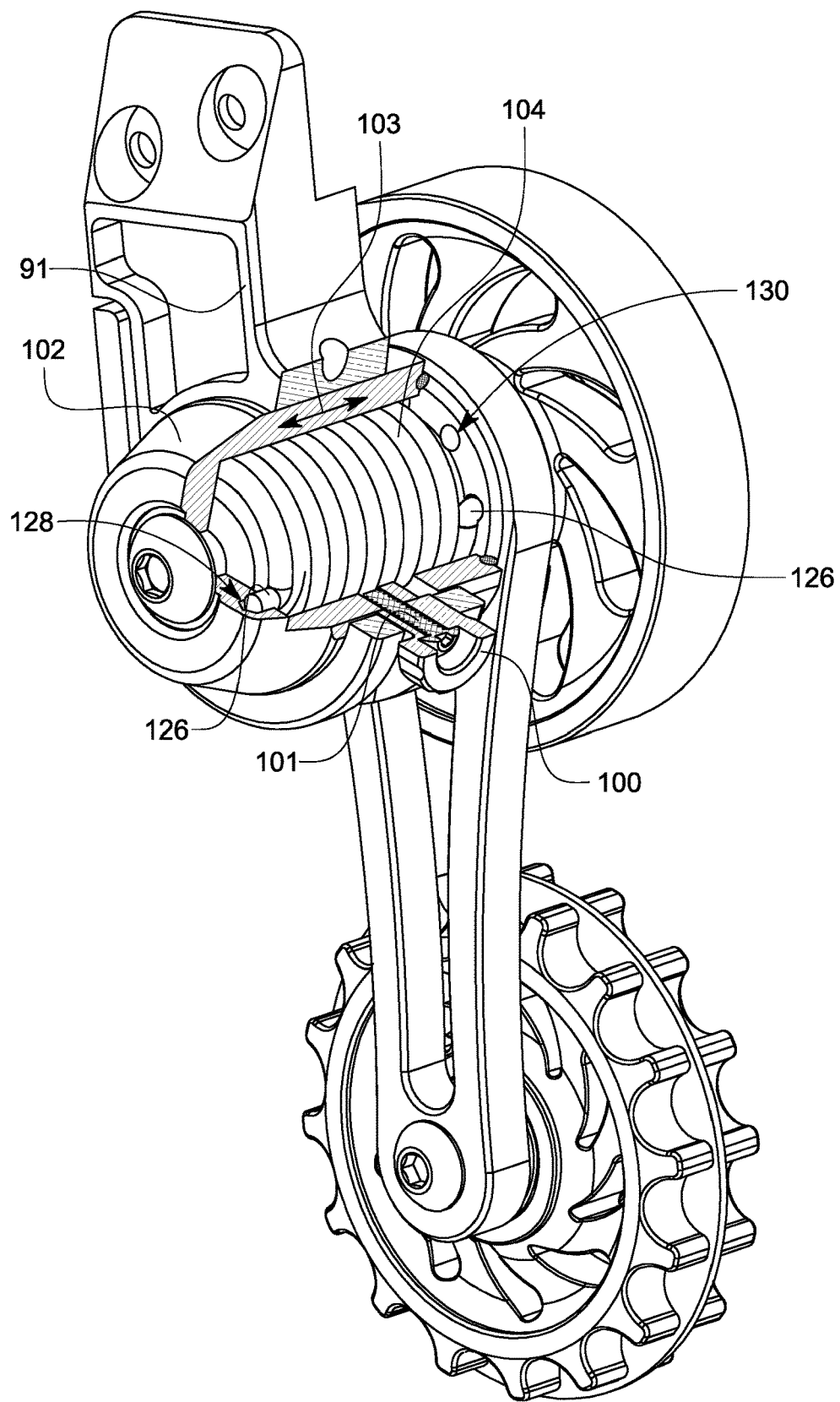
FIG. 8 illustrates a cutaway of the tensioner device shown in FIGS. 6 and 7.
Figure 9:
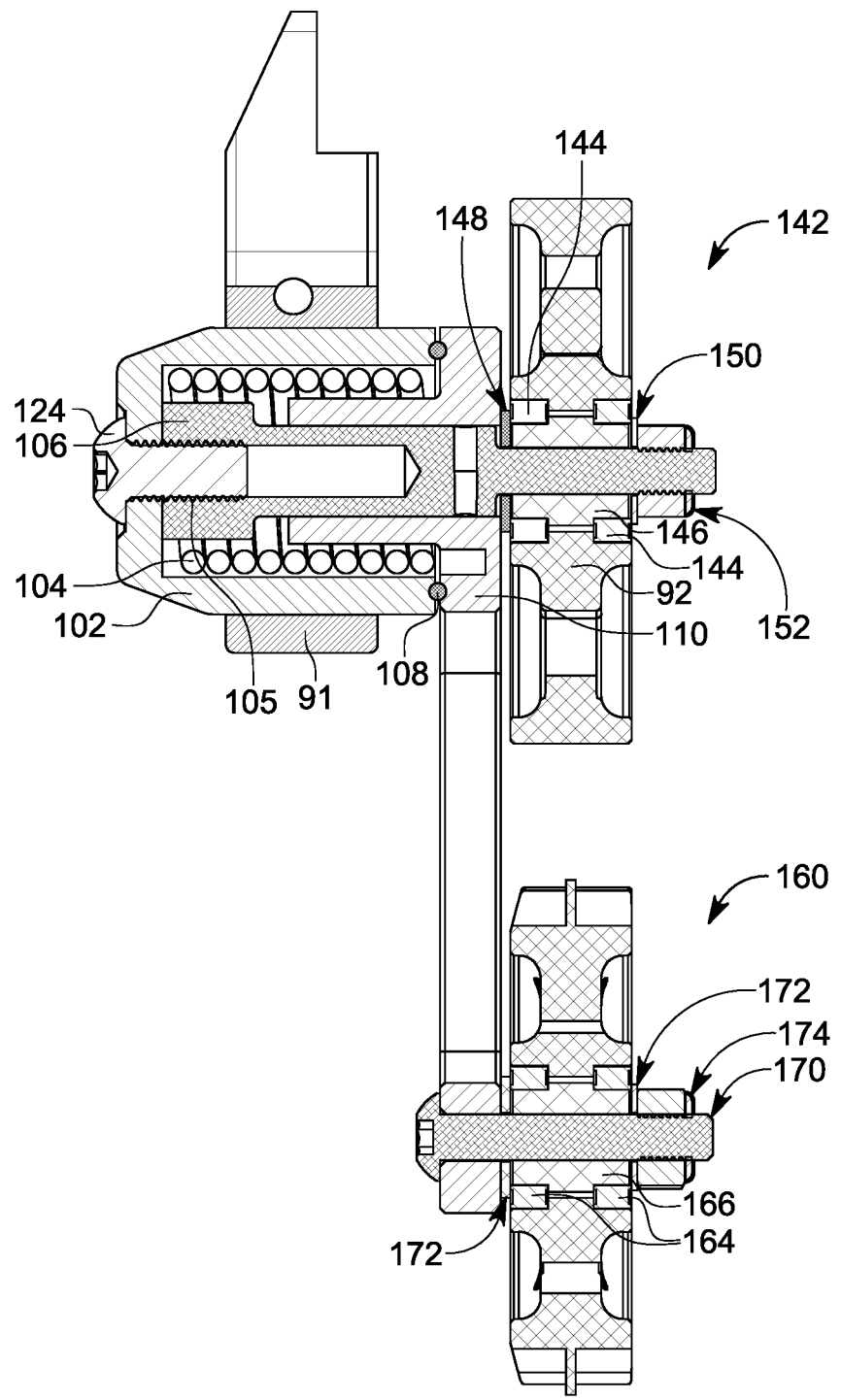
FIG. 9 illustrates a sectional view with the cutting plane intersecting all rotating components of the tensioner device shown in FIGS. 6, 7, and 8.

FIGS. 6-9 illustrate various advantageous features of the tensioner 90 that are now going to be explained. FIGS. 6 and 7 show isometric views from two different perspectives and an exploded view, respectively, of the tensioner 90. FIG. 8 illustrates a cutaway of the tensioner device shown in FIGS. 6 and 7, and FIG. 9 illustrates a sectional view of the upper and lower pulley assemblies of the tensioner shown in FIGS. 6 and 7.

As shown, the tensioner 90 is designed to be mounted via a hanger adapter 49 which possesses two interfaces: an OEM interface 51 to mount the hanger to the dropout 76 (shown in FIG. 4) and a modular interface 53 to mount the tensioner 90 to the hanger adapter 49. A typical derailleur hanger utilizes a conventional threaded element for mounting the derailleur. The tensioner 90 cannot be mounted directly to a standard derailleur hanger—as this is not practical since a derailleur is positioned behind the axle. Due to the inherent novel and advantageous properties of the belt and package, the tensioner 90 is positioned in front of the axle to allow as much belt wrap around the drive sprocket 82 as possible. Furthermore, mounting to a typical hanger would require the overall length of the mounting clamp 91 and/or the swing arm 110 to be increased significantly such that the rigidity and effectiveness of tensioner would be reduced. A mounting clamp 91 is a structural member configured to rigidly support the swing arm assembly 96, providing a modular interface on one end for mounting the tensioner 90 to the hanger adapter 49 and acting as an integral clamping mechanism on the other end supporting and/or restraining the swing arm assembly 96. The mounting clamp 91 holds the spring housing 102 in place and axially restrains the swing arm assembly 96 when the fastener 93 is tightened. The mounting clamp 91 also has a slot 98 in contact with an alignment knob 100 held in place by a threaded fastener 101, said alignment knob 100 being used in the alignment of the tensioner 90 with respect to the chain-line or belt-line.

The swing arm assembly 96 includes a cylindrical body 102 configured to provide an enclosure and interface for a torsion spring 104 and a mounting interface for a pivot shaft 106, the cylindrical body 102 also having a circular profile on an open side thereof so as to accommodate an O-ring 108 and a swing arm 110 of the swing arm assembly 96. An outer diameter of the cylindrical body 102 is configured to mate with the mounting clamp 91 and includes a flat 112 tangent to the outer face thereof that also includes equally spaced thru holes 114 where the alignment knob 100 is disposed. The alignment knob 100 includes a short cylindrical portion 116 and a through hole 118 offset from its center (best shown in FIG. 8), the cylindrical portion 116 being configured to mount to one of the thru holes 114 on the flat 112 on the spring housing 102 by the threaded fastener 101. As shown better in FIG. 6, the alignment knob 100 interfaces with the slot 98 on the mounting clamp 91 through the flat lateral guides 98 on the mounting clamp 91 so as to facilitate both course and fine adjustment via the equally spaced thru holes 114 on the cylindrical body 102 and the eccentric rotation of the alignment knob 100, respectively, thereby allowing the alignment to be adjusted by selection of which hole 114 is used and by manipulation and rotation of the alignment knob 100 clockwise or counter clockwise.

This alignment functionality is best seen in FIG. 8. First, a course alignment is performed by loosening the threaded fastener 93 and removing fastener 101 and placing the alignment knob 100 and fastener 101 at the preferred hole 114 of the cylindrical body 102. Further, a fine alignment can be accomplished with the threaded fastener 101 loose enough as to allow rotation of the alignment knob 100 by hand. Due to the eccentric mounting of the alignment knob 100 as previously discussed, rotation of the knob will cause the swing arm assembly 96 to move in the direction of the arrows 103 shown in FIG. 8 with respect to the mounting clamp 91 which is fixed to the bike frame via the hanger adapter 49. Once the swing arm assembly is at the desired location, it is secured in place by tightening the threaded fastener 101. In another embodiment, an alignment bushing may be used as an alternate embodiment of the alignment knob 100 having one or more alignment holes instead of a knob which allows adjustment by inserting an adjustment tool.

As shown in FIGS. 7 and 9, the pivot shaft 106 is a stepped shaft, having three portions/diameters (respective elements 107, 120, and 122 in FIG. 7), with the middle diameter 120 structurally supporting the swing arm 110 and the portion with the smallest diameter 122 supporting the first or upper pulley 92, the pivot shaft 106 being mounted to the spring housing 102 of the swing arm assembly 96 via an integral mounting boss/female blind thread (element 105 shown in FIG. 9) and a threaded fastener 124, said pivot shaft 106 being further configured to act as the pivot for the swing arm 110, both elements 92 and 110 rotating around the same rotational axis (the axial or longitudinal axis of the pivot shaft 106). The torsion spring 104 is a custom-coil spring with bent ends 126 (shown in both FIGS. 7 and 8) and a specific pitch, the bent ends being restrained by blind holes 128 (not shown in FIG. 7, but shown in FIG. 8) in the spring housing 102 and a plurality of blind holes (illustrated as element 130 in FIGS. 7 and 8) in the swing arm 110. Said torsion spring 104, ultimately applies tension to the belt 80.

The swing arm 110 further includes a structural member 132 that interfaces with the torsion spring 104 and converts torque generated by the torsion spring 104 into a force. As shown in FIG. 7, this structural member 132 has a male boss 134 having a thru hole 136 which mates with and rotates about the pivot shaft 106 and a mounting hole 138 at one end for retaining the second or lower pulley assembly 160. The swing arm 110 also comprises a circular profile 140 that mates with the O-ring 108 and the corresponding surface of the spring housing 102. Those of ordinary skill will recognize that one of the advantageous features of the swing arm 110 is that it is an open design that saves weight and allows for easier installation and removal of both the belt and tensioner assembly. Conventional derailleurs/tensioners have two arms on either side of the belt or chain, forming a cage that requires disassembly to get the belt or chain off. Those of ordinary skill in the applicable arts will appreciate that the rotation of the swing arm 110 and of the first pulley 92 about the same axis provides various novel and advantageous benefits to the subject matter disclosed herein, including: (1) simpler design with fewer parts. If the upper pulley and the swing arm did not share the same pivot axis, and thus the same mounting shaft, a second mounting setup would need to be created to mount the upper or first pulley; (2) elimination of the need for another mechanism/moving parts to retain the adjustable preload feature since the position of the upper pulley should remain fixed relative to the driving cog throughout all the swing arm rotational movement; (3) reduction of the time needed to setup and adjust the tensioning device; (4) increased reliability due to the fact that there are less moving parts that can be damaged or fail; and (5) reduction in the overall package size and weight since the number of parts is reduced.

An upper pulley assembly 142 of the tensioner 90 includes the upper or first pulley 92, radial roller bearings 144, and a dual shoulder spacer bushing 146 (elements 144 and 146 are shown in FIG. 9) so as to allow attachment of the upper pulley assembly 142 to the pivot shaft 106 by use of a thrust washer 148, a flat washer 150, and a vibration-resistant hex nut 152. As shown, the upper pulley 92 comprises a smooth outer diameter, which contacts and supports the smooth side of the belt 80, and one or more centralized counter bores (FIG. 9), one on each face, configured to restrain the two radial roller bearings 144.

FIGS. 7 and 9 also illustrate a lower or second pulley assembly 160, which is comprised of the lower or second pulley 94 having teeth 162 to mate with the toothed side of the belt 80, and a continuous alignment rib 165 on the outer diameter that includes centralized counter bores, one on each face. To help reduce noise and maintain smooth operation, the center alignment rib 165 is continuous and its diameter is slightly larger than that of OD of the teeth. In other embodiments the outside diameter of the continuous alignment rib 165 is the same as that of the pulley. The lower pulley assembly 160 of the tensioner 90 also includes radial roller bearings 164, and a dual shoulder spacer bushing 166 (shown in FIG. 7).

The dual shoulder spacer bushing 166 is configured to mate with the inner race of the radial ball bearings 164 (better shown in FIG. 9) and comprises a shoulder that provides proper spacing and prevents the bearings from binding when loaded in the axial direction when they either are pressed into the pulley or when the assembly is installed and restrained with the washers 172 and the hex nut 174. The dual shoulder spacer bushing 166 is further configured to allow the bearings to easily be removed for service or replacement, said dual shoulder spacer bushing 166 further comprising a centralized thru hole 168 to allow the pulley assemblies to be mounted to the structural member 132 of the swing arm 110 via either the male threads of the pivot shaft 106 or a socket button head cap screw 170 and the vibration-resistant hex nut 174.

Figure 10:
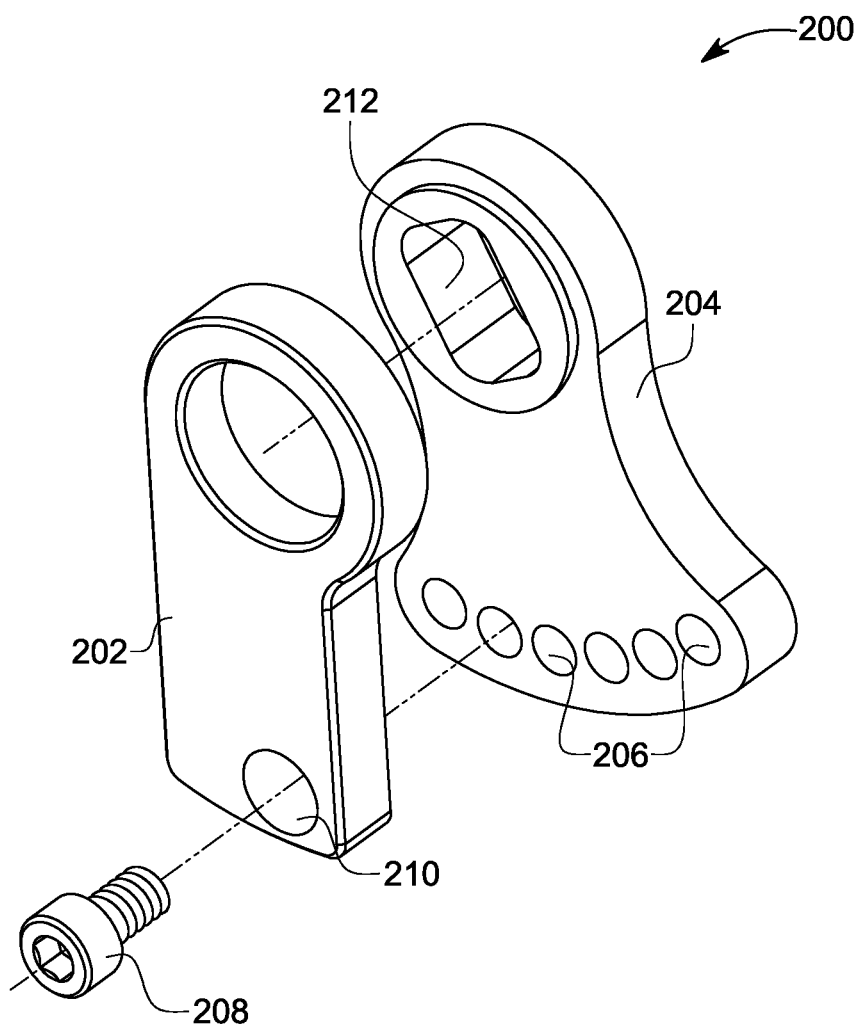
FIG. 10 illustrates an adjustable anti-rotation key according to another embodiment of the subject matter disclosed.

For IGH systems that require a particular angular position of the axle 34 before clamping the IGH system to the bicycle, an adjustable anti-rotation key 200, as shown in FIG. 10, may be used. Those of ordinary skill in the art will appreciate that, because some IGH systems have components (such as a gear shifting knob and/or a cable holder of a shifting mechanism) requiring proper orientation with respect to the chain or belt so it does come in contact with the belt or frame, such an adjustable anti-rotation key 200 would be advantageous. As illustrated in FIG. 10, the system 200 comprises a first component 202 that is stationary (i.e., kept in place by how the shape of the dropout fits into the cutout in the frame) and a second component 204 having a plurality of holes 206 that allows the angle of the second component 204 to be adjusted with respect to the first component 202 and fixed in place by a fastener 208 passing through a guide hole 210 in the first component 202 and threaded to the desired hole 206 in the second component 204. The second component 204 also including a rectangular slot 212 to engage with the flat surfaces of the axle 34.

Figure 11:
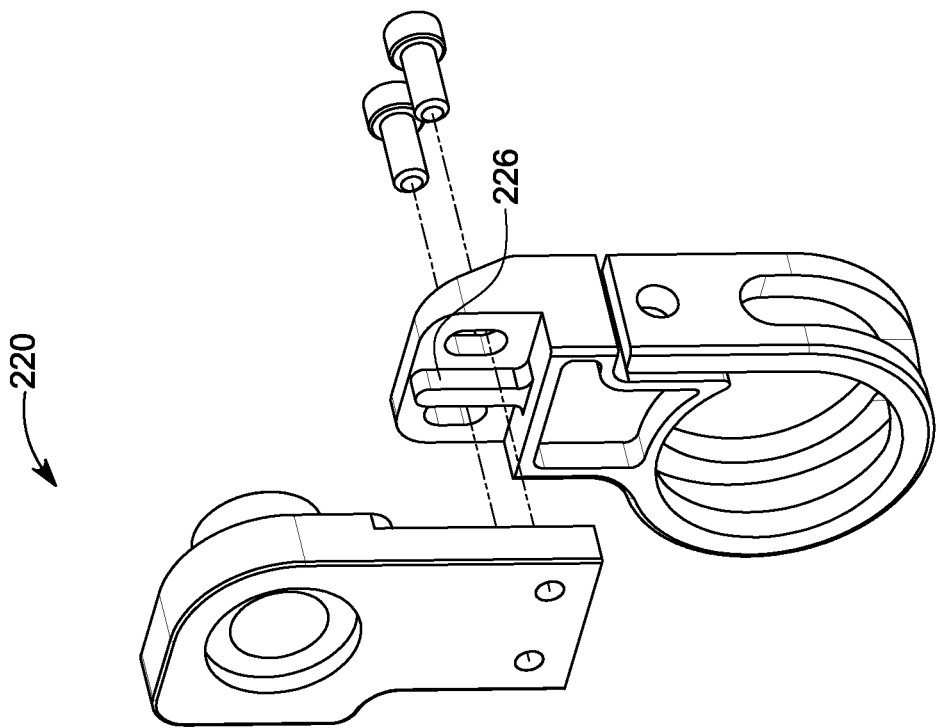
FIG. 11 illustrates two different perspectives of an exploded isometric view of an hanger adapter according to another embodiment of the subject matter disclosed.
Figure 11:
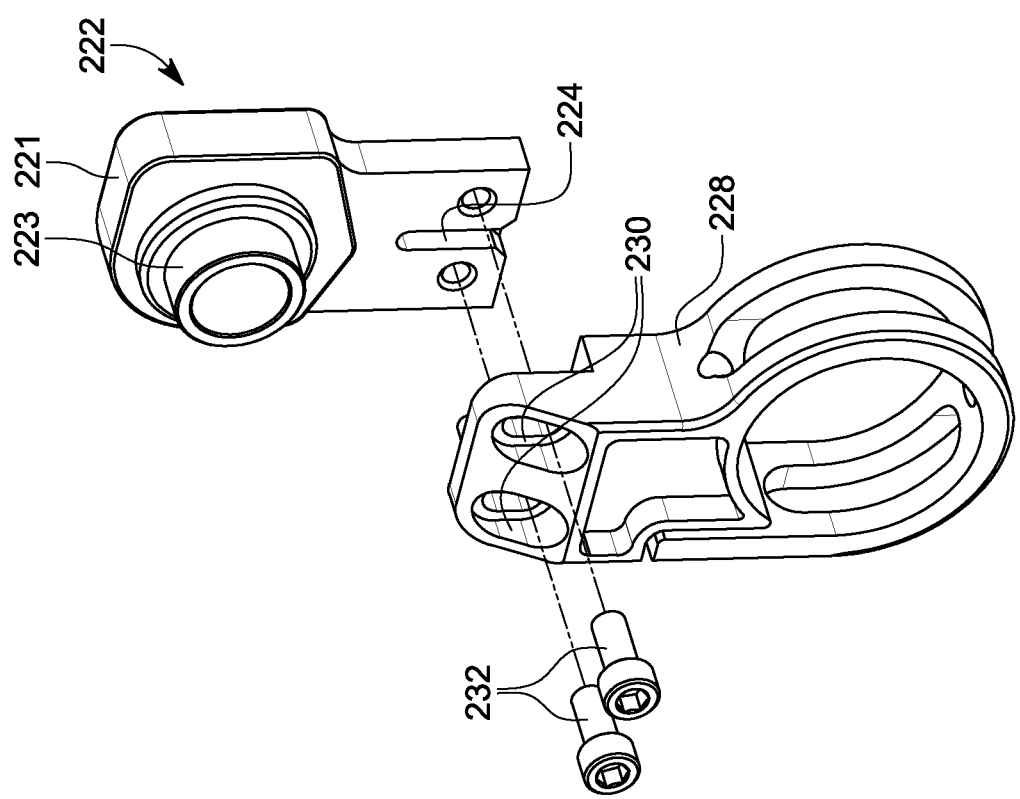

Depending on the manufacturer of the bicycle being modified by the subject matter disclosed herein, variation in the design of the hanger adapter 49 with respect to the OEM interface may be desired in order to take full advantage of the modularity of the tensioner 90. An example of such variations is shown in the OEM interface 51 of the hanger adapter 49 illustrated in FIG. 7 and the OEM interfaces 221 and 223 of another hanger adapter 220 as illustrated in FIG. 11.

Due to the integrated snubbing feature of the tensioner, variations in manufacturing tolerances are taken into account for all components in the system in addition to various size drive pullies and cogs. In order to accommodate these variations, one embodiment of a mounting clamp 228, illustrated in FIG. 11, comprises slots 230 which allow vertical adjustment of the position of the tensioner 90 with respect to the centerline of the axle 34. This mounting clamp 228 also comprises a male alignment feature 226 that mates with a female groove 224 on the hanger adapter 222 so as to maintain vertical alignment relative to each other, the mounting clamp 228 being finally secured in place by fasteners 232.

Those of skill in the applicable arts will understand that the tensioning assembly just illustrated and explained allows for both coarse and fine adjustment of the preload. Coarse adjustment in some embodiments may be achieved by disassembly and can be adjusted in 45-degree increments via the plurality of holes in the swing arm which restrain the end of the torsion spring. Fine preload adjustment can be performed in situ from about 0 up to approximately 135 degrees without having to disassemble. In addition, alignment is maintained during either adjustment process due to the integrated alignment system which doubles as a guide.

Those of ordinary skill in the applicable arts, after considering the subject matter s disclosed herein, will appreciate at least two advantageous features of the tensioner system 90. First, the system is configured to automatically maintain adequate tension on the chain 42 or belt 80. That is, as the rear suspension of a typical full suspension bicycle articulates through its range of motion, the chain stay length (defined as the distance from the center of the bottom bracket to the center of the rear axle) changes accordingly. As a result, the compliant tensioning mechanism disclosed herein takes up or gives slack as needed and maintain proper chain or belt tension. In addition, if not enough tension is applied to the belt, slipping, or what is known as "ratcheting," can occur and potentially cause damage to the belt. In order to prevent this this, a snubber must be used. Secondly, the tensioner system 90 acts as a snubber, as already explained.

In addition, it is the modular design of the tensioner system 90 that allows it to be used on essentially any brand or bicycle type that utilizes a removable derailleur hanger by means of an OEM specific hanger adapter and a single sided swing-arm with two pulleys, one smooth and one with cogs. Tensioning force is provided by a custom torsion spring. There is a common stationary pivot shaft which supports the swing arm and smooth upper pulley. The upper pulley is fixed and acts as an idler puller which the lower pulley is fixed to the swing arm and moves with it as it rotates. The main assembly is fastened to a bicycle specific hanger with two screws thus allowing for easy installation and removal, and interchangeability between setups/other equipped bicycles. As explained, the assembly has an integrated alignment system which allows the Swing Arm Assembly/Pulleys to be course aligned in 0.100-inch increments up to 0.300 inches and fine aligned via the eccentric cam/follower mechanism in either direction as much as 0.06 inches.

These two systems offer future end consumers a lower cost option and opportunity to enjoy the benefits of an Internally geared hub and belt-drive system without having to purchase a purpose-built bike as the two systems can be independently adapted to most bicycles.

Figure 12:
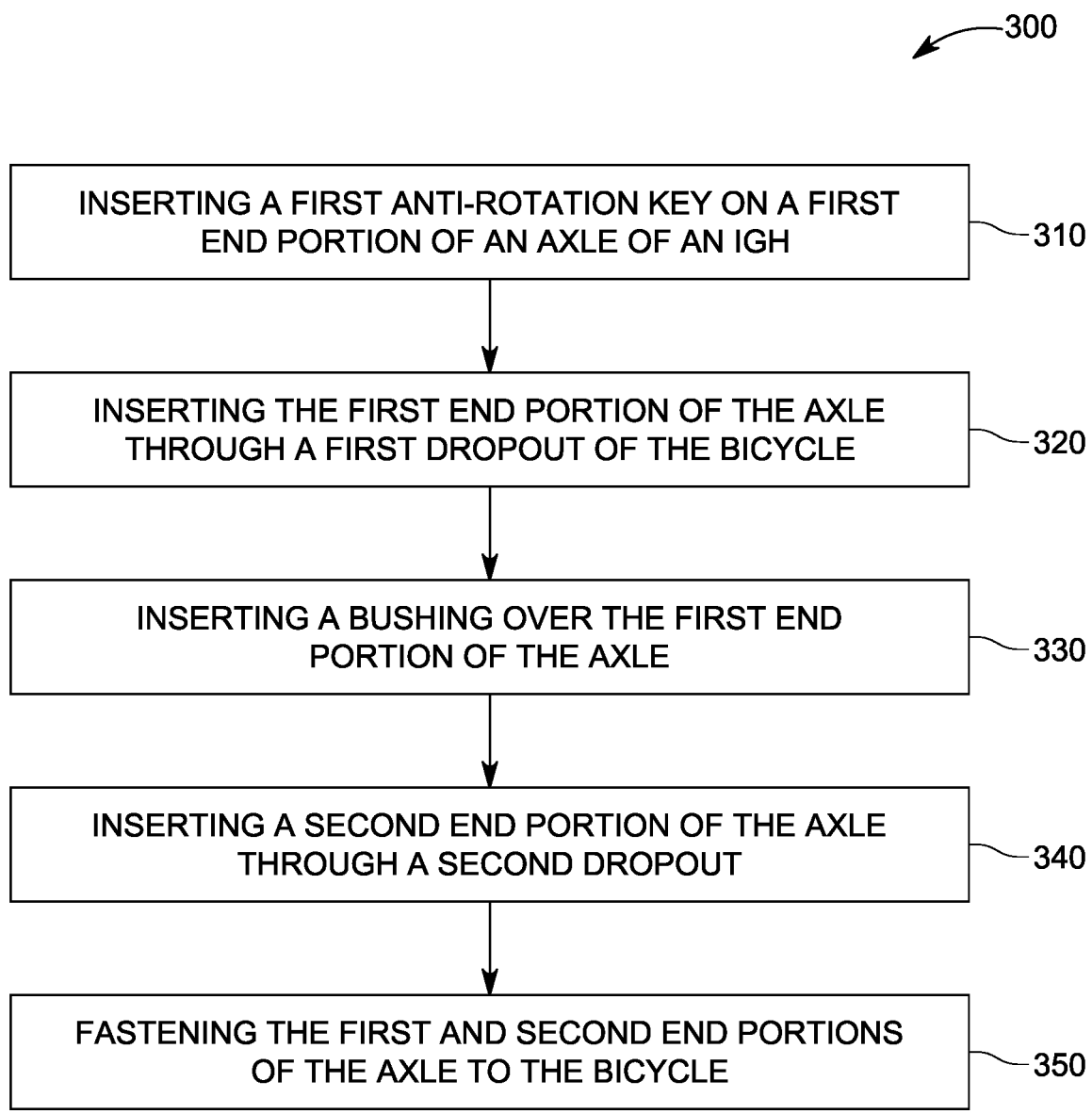
FIG. 12 illustrates a flowchart of a method to install a belt- or chain-driven IGH on an existing bicycle according to another embodiment of the subject matter disclosed.
Figure 13:
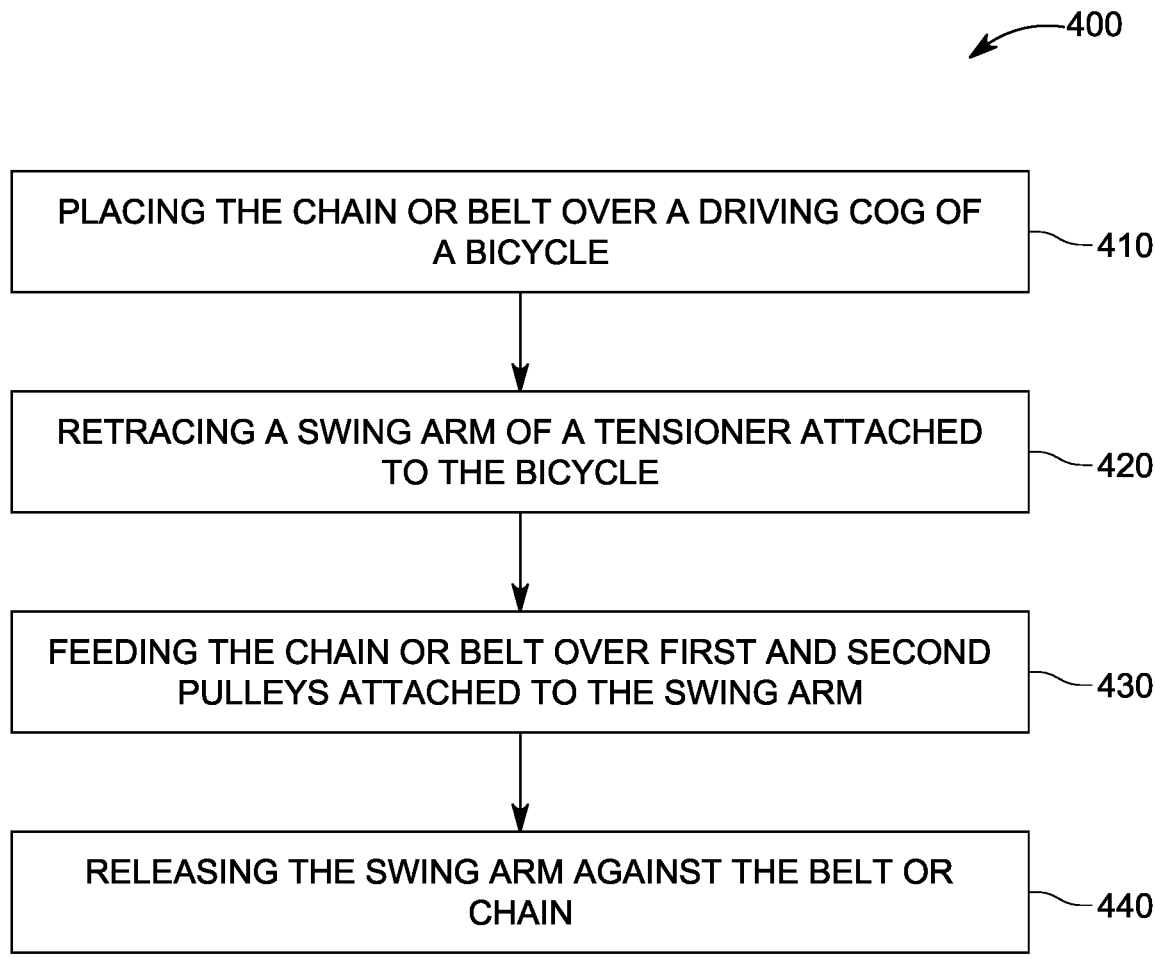
FIG. 13 illustrates a flowchart of a method to apply tension to a belt- or chain-driven bicycle according to another embodiment of the subject matter disclosed.

Methods and processes to modify a conventional bicycle with the advantageous features of the apparatuses and systems disclosed herein as well as applying tension to a belt or chain of a bicycle are also within the scope of the subject matter disclosed. FIG. 12 illustrates the flowchart of an exemplary embodiment of a method or process 300 for converting the drive system of a bicycle from a thru-axle-derailleur-sprocket drive system to an IGH utilizing a solid-axle drive system. As shown, at 310, such methods include inserting a first anti-rotation key on a first end portion of an axle of the IGH, the first anti-rotation key having an outer profile that mates with a profile of an alignment guide in the frame of the bicycle and a rectangular slot that mates with a flat surface of the axle. At 320, these methods further include inserting the first end portion of the axle with the first anti-rotation key through the first dropout and, at 330, inserting a bushing between the first anti-rotation key and the dropout. At 340, the processes disclosed further includes inserting the opposite end of the axle through a second dropout in the frame of the bicycle, and, at 350, fastening both ends of the axle to the bicycle.

The disclosed methods and processes also includes a method 400 to apply tension to a chain or a belt in a bicycle, the method 400 including, at 410, placing the chain or belt over a driving cog the bicycle; at 420, retracing a swing arm of a tensioner attached to the bicycle; at 430, feeding the chain or belt over first and second pulleys on the swing arm of the tensioner; and, at 440, releasing the swing arm against the belt or chain, wherein the first pulley and the swing arm rotate about the same longitudinal axis.

In some example embodiments, one or more of the steps of the operations/flows described herein may not be performed. Moreover, operations in addition to or in lieu of the steps described herein may be performed. Further, in some example embodiments, one or more of the steps described herein may be performed out of order, in an alternate sequence, or partially (or completely) concurrently with each other or with other steps.

Embodiments and techniques, including methods, described herein may be performed in various ways such as, but not limited to, being implemented by equivalent types of hardware and mechanical components.

The disclosed exemplary embodiments provide apparatuses, methods, and systems for the conversion of conventional bicycles to include an IGH and tensioning system and it should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel and advantageous teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A belt or chain tensioning device for a bicycle, comprising:
   a mounting clamp;
   a swing arm assembly directly supported by the mounting clamp, the swing arm assembly including a spring housing; a stepped pivot shaft having first, second, and third portions of different diameters, the first portion of the stepped pivot shaft engaging with an inner portion of the spring housing; and a torsion spring having a first end thereof secured to the spring housing, wherein the stepped pivot shaft is attached to the spring housing by a screw;
   a swing arm having a male boss at a first end portion thereof with a thru hole that cylindrically mates on the second portion of the stepped pivot shaft, and a plurality of blind holes to receive a second end of the torsion spring, wherein an amount of tension in the belt or chain depends on which of the blind holes receives the second end portion of the torsion spring;
   a first pulley rotatably supported by the third portion of the pivoted shaft, wherein the first pulley and the swing arm rotate about a longitudinal axis of the stepped pivot shaft; and
   a second pulley rotatably attached to the swing arm at a second end portion thereof.

2. The tensioning device according to claim 1, further comprising:
   a hanger adapter to attach the tensioning device to a frame of the bicycle.

3. The tensioning device according to claim 1, further comprising:
   a plurality of alignment holes disposed on an outer surface of the spring housing of the swing arm assembly; and
   an alignment knob disposed thru a slot on the mounting clamp and attached to one of the alignment holes, wherein an axial position of the swing arm assembly with respect to the mounting clamp changes depending on which one of the alignment holes the alignment knob is attached such as to allow for a first adjustment of an axial position of the swing arm assembly with respect to the frame of the bicycle.

4. The tensioning device according to claim 3, wherein the alignment knob has a through hole offset from a longitudinal axis thereof such that an eccentric rotation of the alignment knob once attached to one of the alignment holes allows for a second adjustment of the axial position of the swing arm assembly, wherein the second adjustment is finer than the first adjustment.

5. The tensioning device according to claim 1, wherein the first pulley acts as a snubber so as to keep the belt in contact with a driving cog of the bicycle so as to minimize ratcheting or slippage of the belt.

6. The tensioning device according to claim 1, wherein the mounting clamp further comprises slots to vertically adjust a vertical position of the tensioning device with respect to an axle of the bicycle.

7. The tensioning device according to claim 2, wherein the mounting clamp and the hanger adapter further comprise corresponding male and female grooves to maintain an alignment of the mounting clamp relative to the hanger adapter.

8. The tensioning device according to claim 1, wherein the second pulley further comprises a continuous alignment rib with centralized counter bores, the continuous alignment rib to be inserted into a corresponding slot on the belt connected to a driving cog of the bicycle, wherein an outer diameter of the alignment rib is larger than an outside diameter of the second pulley.

9. A kit for converting a bicycle from a derailleur-sprocket drive system to an Internally Geared Hub (or an IGH) drive system, the IGH having an axle with first and second end portions, each end portion having a male thread and two opposing flat surfaces, the kit comprising:
   a tensioning device according to claim 1;
   a first anti-rotation key having an outer profile that mates with a profile of an alignment guide on a first dropout in a frame of the bicycle and a rectangular slot that mates with the two opposing flat surfaces of the first end portion of the axle so as to prevent the axle from rotating when the IGH is secured to the bicycle;
   a bushing having a thru hole so as to fit over the first end portion of the axle, a slanted chamfer on a first end portion thereof to engage with a corresponding chamfer on the first dropout, and a flat end portion opposite to the first end portion of the bushing;
   a first fastener to secure the first end portion of the axle to the bicycle, the first fastener having a first female thread on an inside surface thereof to engage with the male thread of the first end portion of the axle, a first smooth shank with an outer diameter so as to fit thru a first hole in the first dropout, and a flange to engage with the flat end portion of the bushing; and
   a second fastener to secure the second end portion of the axle to the bicycle, the second fastener having a second female thread on an inside surface thereof to engage with the male thread of the second end portion of the axle, and a second smooth shank with an outer diameter so as to fit thru a second hole in a second dropout in the frame, wherein the first and second fasteners are configured to center the IGH laterally within the first and second dropouts when both fasteners are tightened.

10. The kit according to claim 9, wherein the first anti-rotation key is adjustable and comprises:
   a first component having an outer profile that mates with the profile of the alignment guide on the first dropout in the frame of the bicycle so as to keep the first component substantially stationary with respect to the frame, the first stationary component having a guide hole; and a second component rotatably attached to the first component, the second component having a plurality of threaded holes and a rectangular slot to engage with the two opposing flat surfaces of the first end portion of the axle so that an angular position of the second component with respect to the first component can be adjusted by a rotation of the second component relative to the first component and secured in place by a fastener passing thru the guide hole and threaded to one of the threaded holes.

11. A method for applying tension to a chain or a belt in a bicycle, the method comprising:
placing the chain or the belt over a driving cog of the bicycle; retracting a swing arm of a swing arm assembly of a tensioner attached to the bicycle by rotating a male boss of the swing arm over a stepped pivot shaft of the swing arm assembly, the male boss having a thru hole, the stepped pivot shaft having first, second, and third portions of different diameters and the thru hole of the male boss of the swing arm cylindrically mating on the second portion of the stepped pivot shaft;
feeding the chain or the belt over first and second pulleys on the swing arm of the tensioner; and
releasing the swing arm against the belt or the chain, wherein the first pulley and the swing arm rotate about a same axis of rotation.

12. The method according to claim 11, wherein the alignment knob has a through hole offset from a longitudinal axis thereof, the method further comprising:
second adjusting the second axial position of the swing arm assembly with respect to the frame of the bicycle by an eccentric rotation of the alignment knob once attached to one of the alignment holes, wherein the second adjusting is finer than the first adjusting.

13. The method according to claim 11, further comprising: snubbing an outer surface of the first pulley against the belt in contact with the driving cog of the bicycle so as to minimize ratcheting or slippage of the belt.

14. The method according to claim 11, further comprising:
adjusting a vertical position of the tensioning device with respect to an axle of the bicycle by moving the tensioner in slots provided in the mounting clamp.

15. The method according to claim 11, further comprising:
reducing belt operating noise by inserting a continuous alignment rib on the second pulley into a corresponding slot on the belt connected to the driving cog of the bicycle, wherein the continuous alignment rib includes centralized counter bores and an outer diameter of the alignment rib is larger than an outside diameter of the second pulley.

16. A method for converting the drive system of a bicycle from a thru-axle-derailleur-sprocket drive system to an Internally Geared Hub (or an IGH) drive system, the method comprising:
inserting a first anti-rotation key on a first end portion of an axle of the IGH, said first anti-rotation key having an outer profile that mates with a profile of an alignment guide on a first dropout in a frame of the bicycle and a rectangular slot that mates with at least one flat surface of the first end portion of the axle to prevent the axle from rotating when the IGH is secured to the bicycle;
inserting the first end portion of the axle with the first anti-rotation key through the first dropout;
inserting a bushing having a thru hole that fits over the first end portion of the axle, the first dropout being disposed between the first anti-rotation key and the bushing, said busing comprising a slanted chamfer on a first end portion thereof to engage with a corresponding chamfer on the first dropout, and a flat end portion opposite to the first end portion of the bushing;
inserting a second end portion of the axle through a second dropout in the frame of the bicycle;
fastening a first fastener to the first end portion of the axle, the first fastener having a first female thread on an inside surface thereof to engage with a male thread of the first end portion of the axle, a first smooth shank with an outer diameter so as to fit thru a hole in the first dropout, and a flange to engage with the flat end portion of the bushing;
fastening a second fastener to the second end portion of the axle to secure the second end portion of the axle to the bicycle, the second fastener having a second female thread on an inside surface thereof to engage with a male thread of the second end portion of the axle, and a second smooth shank with an outer diameter so as to fit through a hole in the second dropout in the frame, wherein the first and second fasteners are configured to center the IGH laterally within the first and second dropouts when both fasteners are fastened; and
applying tension to a chain or belt of the bicycle according to the method of claim 11.

17. The method according to claim 16, further comprising:
before the inserting of the second end portion of the axle through the second dropout, spreading a rear triangle of the frame a prescribed amount so as to allow the inserting of the first and second end portions of the axle through the first and second dropouts without causing plastic deformation of the frame.

18. The method according to claim 16, wherein the first anti-rotation key is adjustable and includes a first component having an outer profile that mates with the profile of the alignment guide on the first dropout in the frame of the bicycle so as to keep the first component substantially stationary with respect to the frame, the first stationary component having a guide hole, and a second component rotatably attached to the first component, the second component having a plurality of threaded holes, the method further comprising:
adjusting an angular position of the second component with respect to the first component by rotating the second component to a desired angular position and fastening the first and second components together by inserting a fastener passing thru the guide hole and threading the fastener to one of the threaded holes on the second component.

19. A tensioning device for a bicycle, comprising:
a mounting clamp;
a swing arm assembly directly supported by the mounting clamp, the swing arm assembly including a stepped pivot shaft having first, second, and third portions of different diameters;
a swing arm having a male boss at a first end portion thereof that cylindrically mates on the second portion of the stepped pivot shaft;
a first pulley rotatably supported by the third portion of the stepped pivot shaft, wherein the first pulley and the swing arm rotate about a same longitudinal axis of the stepped pivot shaft; and
a second pulley rotatably attached to the swing arm at a second end portion thereof.

20. The tensioning device according to claim 19, further comprising:
- a plurality of alignment holes disposed on an outer surface of the spring housing of the swing arm assembly; and
- an alignment knob disposed thru a slot on the mounting clamp and attached to one of the alignment holes, wherein an axial position of the swing arm assembly with respect to the mounting clamp changes depending on which one of the alignment holes the alignment knob is attached such as to allow for a first adjustment of an axial position of the swing arm assembly with respect to the frame of the bicycle.

* * * * *